Patented Aug. 14, 1945

2,381,969

UNITED STATES PATENT OFFICE 2,381,969

COMPLEX RESINOUS ESTERS

William R. Catlow, Jr., Bloomfield, N. J., assignor to Bakelite Corporation, New York, N. Y., a corporation of New Jersey No Drawing. Application August 3, 1940,
Serial No. 351,219

14 Claims. (Cl. 260—22)

This invention relates to resinous products of the ester type obtained in the reaction of polyhydric alcohols with polybasic acids or their anhydrides.

The invention rests on the discovery that an adduct or addition product of maleic anhydride with cyclopentadiene, reacted with rosin or other acid resin and a polyhydric alcohol as glycerol yields a resinous complex ester product that is compatible in substantially all proportions with fatty or drying oils or their acids. The complex ester resin has been found particularly useful in varnishes prepared from the "softer" or slow drying oils as linseed, perilla, fish, etc. or combinations as soya bean and tung or oiticica oil, and treated non-drying oils as dehydrated castor oil, since it imparts to them a drying speed within a range generally associated with hard drying or highly conjugated oils, as tung and oiticica oils. Moreover, the color retention and durability of deposited films are markedly improved as compared with the typical rosin ester varnish films.

The following examples illustrate methods of preparing products to which this invention relates. All parts are by weight unless otherwise stated.

*Example 1.*—73 parts of rosin were charged into a still and slowly heated to about 120° C.; 15.6 parts of glycerine were slowly introduced, and the temperature was raised to about 170° C. A small stream of carbon dioxide or inert gas was admitted to the still while the heating was continued and the temperature raised to about 260°–265° C. or until a sample showed an acid number of about 20 or less. Thereupon the charge was cooled to about 200° C. and about 11 parts of the cyclopentadiene adduct of maleic anhydride were added. The charge was again brought to a temperature of about 250° C. and held until the acid number was about 15 or less. The product was then discharged and cooled to a hard, brittle resin with a melting point of about 120° C. by the ball and ring method and, in solution with an equal part of toluene, having a color of about 4–6 on the Hellige scale.

A similar resin, prepared in the same manner but using 90 parts of rosin, 16 parts of glycerol and 10 parts of the adduct, had an acid number of 6.7, a melting point of about 105° C. and a color of 5+.

The order in which the ingredients are reacted is not important, that is, the same results follow when the acidic ingredients are interchanged. There does, however, appear to be a range of proportions between the acidic components outside of which it is not desirable to operate; when more than 23 parts of the adduct of this example to 100 parts of the rosin are included there is a tendency toward the formation of gel, while with less than 10 parts of the adduct there is a rapid diminishing of the beneficial effects of the ester product in varnishes. The amount of glycerol used is that required to give the desired acid values, generally not above 15, since resins of higher values yield varnishes which are reactive with many of the pigments commonly used in enamels; on the other hand it is desirable to avoid an excess of glycerol because of the expense and lowering of water resistance.

In place of rosin other natural resins, or their corresponding acids, as copal, manilla, congo, etc. can be substituted with comparative results; in general natural resin acids of a terpene-like structure are suitable. Other polyhydric alcohols as pentaerythritol, mannitol, sorbitol, sugar and other alcohols made use of in preparing resinous esters can be substituted for glycerol.

*Example 1a.*—An oil varnish was made from the resinous ester of Example 1 and linseed oil by mixing 100 pounds of the ester with 20 gallons of the oil heat-bodied to a viscosity Z2 (on the Gardner-Holdt viscosimeter). The mixture was heated to about 300° C. and held for about 40 minutes; it was cooled to about 230° C. and 37 gallons of petroleum thinner or mineral spirits were added. The solution with 50 per cent solids had a viscosity at room temperature of E–F. Liquid driers were added to give per gallon as metal about 6 grams of lead, 0.4 gram of manganese and 0.2 gram of cobalt. A film of the clear varnish dried dust-free in 2 hours and to touch in 10 hours.

The varnish was found especially useful as a vehicle for making high gloss white enamels. A formula used was that of mixing 203 pounds of titanium oxide, 203 pounds of titanium-calcium pigment, 37.5 pounds of zinc oxide and 75 gallons of the varnish from which the driers were omitted. All materials were loaded into a pebble mill and ground until a smooth and uniform mixture was obtained. Driers of the amount and character described as added to each gallon of the varnish were then incorporated in the enamel together with one-half gallon of mineral spirits containing 8 per cent zinc naphthenate measured as metal. A coating of the enamel on air-drying set in 2.5 hours, had only a slight tack at the end of 6 hours and became hard overnight. The film had excellent gloss and color retention. The enamel showed no appreciable bodying in the package after standing on the shelf for over a year. It has found extended use as a general purpose interior enamel, being superior to ester gum enamels in color, water and soap resistance and freedom from checking.

*Example 1b.*—As an illustration of the usefulness of the resin ester in the preparation of varnishes with other oils, 20 gallons of dehydrated castor oil, 50 pounds of the resin of Example 1 and 50 pounds of ester gum were heated to about 300° C. and held for about 4 hours; the greatly increased bodying time required as compared with the varnish of the previous example was due to the presence of the ester gum. Upon cooling to about 230° C. 40 gallons of petroleum thinner were introduced. A 50 per cent solids solution had a viscosity of E. A film of the clear varnish with the inclusion of driers as specified in the previous example air-dried to touch in 5 hours and became hard in 10 hours.

A white enamel was prepared from 237 pounds of titanium oxide, 217 pounds of titanium-calcium pigment and 79 gallons of the varnish. Driers were added to give as metal per gallon 4.2 grams lead, 0.4 gram cobalt, 0.2 gram manganese. The enamel as a coating dried to touch in 3.5 hours and became quite hard overnight. The coating had a very high gloss and was a good non-yellowing white.

*Example 2.*—It is not essential that the complex resinous ester be completed in one operation. It has been found possible to prepare a partially esterified hard intermediate by reacting the maleic anhydride adduct with a solid polyhydric alcohol as pentaerythritol. This can be stocked to be later used with diluting resins as demanded and in amounts desired and completing the esterification with glycerol or other polyhydric alcohol. Thereby a wide variety of varnish-fortifying resins or complex resinous esters are available.

As an instance 73.3 parts of the cyclopentadiene adduct of maleic anhydride were heated to about 200° C. and 26.7 parts of pentaerythritol were added; heating was continued until the alcohol was in solution. The cooled product had an acid number of 210, melting point of about 125° C. and a color 1 when dissolved in an equal part of ethyl acetate.

A completed complex resinous ester was made by taking 100 parts of the above intermediate and 800 parts of water white rosin, and heating to 230° C. in an inert atmosphere; the mass was held at this temperature for about 6 hours or until it had an acid number of about 130. Then 94 parts of glycerol were added and the mass reheated to 255° C. and held for an acid number of below 10 or about 7 hours; it was cooled to 210° C. and discharged. The complex resinous ester had a melting point of 125° C., an acid number of 7.2 and a color of 6+.

*Example 2a.*—A varnish was made from the product of the preceding example by mixing 100 pounds with 20 gallons of tung oil and heating to 230° C. and holding for a light string (about 3 minutes). The mass was then checked by adding 5 gallons of heat-bodied linseed oil and thinned with 200 gallons of petroleum thinner. For an air-drying clear varnish there were added soluble driers.

The varnish was of slightly better color than a similar one prepared from the resin of Example 1 and dried somewhat faster to a faint tack in 1.5 hours and very hard overnight.

Other varnishes and enamels can be prepared as for example similar to those of Examples 1a and 1b.

*Example 3.*—Pentaerythritol sufficient for both the adduct and rosin content of the mixed resin can be employed by first forming the monoester of pentaerythritol with the maleic adduct and then adding enough rosin to complete the esterification of the reactive OH groups remaining on the pentaerythritol residues. Thus one mol (164 grams) of the maleic adduct of cyclopentadiene was first reacted with two mols (272 grams) of pentaerythritol by heating at 180° C. for 4 hours. The product was found to be substantially neutral with an acid number of 5. Six mols of rosin (1812 grams) were added and the heating continued at about 260° C. until the acid number was below 15 and had a melting point upwards of 145° C. (ball and ring).

This type resin has an indicated use in certain printing ink vehicles where an especially high melting point is desirable. Floor varnishes also require this type as do certain types of furniture finishes.

*Example 4.*—The substitution of hydrogenated rosin for rosin in equivalent proportions was tried. It was found, however, to yield complex esters of low melting point, about 95 to 105° C., and dark in color. This fact is indicative of the participation of the double bond of rosin in the formation of the products.

What is claimed is:

1. Resinous product characterized by solubility in varnish oils, comprising the co-ester reaction product of 100 parts by weight of an acidic natural resin, 9 to 23 parts by weight of a cyclopentadiene adduct of maleic anhydride, and a polyhydric alcohol in sufficient quantity for reaction with carboxyl groups of both the acidic natural resin and the adduct.

2. Resinous product according to claim 1 in which the polyhydric alcohol is glycerol.

3. Resinous product according to claim 1 in which the polyhydric alcohol is pentaerythritol.

4. Resinous product according to claim 1 in which the acidic natural resin is rosin.

5. Composition suitable for coatings comprising in combination with a varnish oil, a resinous co-ester reaction product of 100 parts by weight of an acidic natural resin, 9 to 23 parts by weight of a cyclopentadiene adduct of maleic anhydride, and a polyhydric alcohol in sufficient amount for reaction with carboxyl groups of both the acidic natural resin and the adduct.

6. Composition according to claim 5 in which the varnish oil contains no conjugated double bonds.

7. Composition according to claim 5 in which the varnish oil is linseed oil.

8. Composition according to claim 5 in which the acidic natural resin is rosin.

9. An enamel coating composition comprising in combination with a varnish oil, a resinous co-ester reaction product of between 9 to 23 parts by weight of a cyclopentadiene adduct of maleic anhydride with 100 parts by weight of rosin and a polyhydric alcohol in amount to yield a product having an acid number not above 15, and a pigmenting material to form the enamel.

10. Process of preparing a resinous ester soluble in varnish oils which comprises reacting together 100 parts by weight of an acidic natural resin, 9 to 23 parts by weight of a cyclopentadiene adduct of maleic anhydride and a polyhydric alcohol in amount sufficient for reaction with carboxyl groups of both the acidic natural resin and the adduct.

11. Process of preparing a resinous co-ester reaction product soluble in varnish oils which comprises reacting together 100 parts by weight of an acidic natural resin with a substantially neutral esterification product containing sufficient reactive hydroxyl groups to react with substantially all the carboxyl groups of the acidic natural resin, said neutral esterification product being obtained by reacting 9 to 23 parts by weight of a cyclopentadiene adduct of maleic anhydride with an amount of polyhydric alcohol adequate to form a mono ester of the polyhydric alcohol.

12. Process of preparing a resinous co-ester soluble in varnish oils which comprises initially reacting a polyhydric alcohol with 100 parts by weight of an acidic natural resin until the acid number of the partly esterified acidic natural resin is reduced to about 20, and then reacting the partly esterified natural resin with 9 to 23 parts by weight of a cyclopentadiene adduct of maleic anhydride to co-esterify the natural resin and the adduct, sufficient polyhydric alcohol being present in the initial esterification reaction product for reaction with substantially all the carboxyl groups of the acidic natural resin and the adduct.

13. Process of preparing a resinous ester soluble in varnish oils which comprises initially reacting 100 parts by weight of an acidic natural resin with 9 to 23 parts by weight of a cyclopentadiene adduct of maleic anhydride, and then reacting this product with a quantity of polyhydric alcohol sufficient for reaction with substantially all the carboxyl groups of the acidic natural resin and the adduct.

14. Process of preparing a resinous ester soluble in varnish oils to yield varnish vehicles that are non-reactive with enamel pigments, which comprises reacting together 100 parts by weight of an acidic natural resin, 9 to 23 parts by weight of a cyclopentadiene adduct of maleic anhydride and a sufficient amount of a polyhydric alcohol to yield a resinous product having an acid number not over 15.

WILLIAM R. CATLOW, Jr.